Jan. 3, 1939. R. W. GATES Re. 20,960

EGG CASE FILLER

Original Filed June 5, 1936 2 Sheets-Sheet 1

INVENTOR.
Renfrew W. Gates
BY James Harrison Bowen
ATTORNEY.

EGG CASE FILLER

Original Filed June 5, 1936 2 Sheets-Sheet 2

INVENTOR.
Renfrew W. Gates
BY James Harrison Bowen
ATTORNEY.

Reissued Jan. 3, 1939 Re. 20,960

UNITED STATES PATENT OFFICE 20,960

EGG CASE FILLER

Renfrew W. Gates, Gainesville, Fla.

Original No. 2,065,447, dated December 22, 1936, Serial No. 83,805, June 5, 1936. Application for reissue August 29, 1938, Serial No. 228,186

1 Claim. (Cl. 217—26.5)

The purpose of this invention, which relates to egg supports and, more especially, to egg case fillers, is to provide a tray-like filler in which a layer of eggs is encased in an independent and interchangeable filler unit which may be removed from the case in its complete form, and from which the eggs may readily be displayed, and which, at the same time, makes it possible to have the usual number of eggs in a case.

The invention is an independent filler unit comprising two duplicate and complementary members of tray-like formation, with one member inverted and placed upon the other to form the complete unit for one layer of eggs.

Egg cases generally consist of relatively thin wood slats with ends and an intermediate partition, and the eggs are contained in layers in collapsible fillers with flat sheets of material separating the fillers. The flat sheets of material have been replaced in some cases by sheets of odd shapes, some forming cushions and some forming conical shaped pockets which in some cases makes it possible to dispense with the collapsible fillers, however, these have been found objectionable because where pockets are provided the number of eggs in each layer is reduced which confuses the shipper and user, and, where the eggs are held in pockets, dead air areas are formed when the eggs are therein, and also it has been found difficult to remove the eggs; and, therefore, as fillers or flats of this type, or particularly those made of wood pulp, have been recognized as having merit, it has been found desirable to form the filler in such a manner that the usual number of eggs may be used in each layer, and all dead air areas around the eggs eliminated, and also so that the eggs may readily be removed, or so that the filler forms a tray in which a complete layer of eggs may readily be removed from the case.

The primary object of this invention is, therefore, the provision of a filler of this character wherein the recognized number of eggs for a layer can be conveniently contained, which, at the same time, provides a tray, two of which form a complete, separate and independent unit.

Another object is to provide an egg case filler which permits the usual number of eggs in a case, in which the filler may be formed of wood pulp or the like, and in which two members form a complete unit protecting the eggs from above and below.

Another object is to provide an egg case filler in which the eggs are held in independent areas in independent duplicate trays, one forming the base and the other the cover of a complete independent unit.

Another object is to provide an egg case filler of tray-like formation, in which a layer of eggs is encased in an independent unit with the eggs supported from both ends in a substantially vertical position, and in which the eggs are held in open areas, providing maximum circulation therearound.

A further object is to provide an improved egg case filler in which eggs of different sizes may be independently held in open areas with both ends of the eggs held in a complete and independent unit, and in which the material of the unit is relatively thin and at the same time comparatively resilient.

And a still further object of the invention is the provision of a filler of this character, which is simple in its construction, thoroughly reliable and efficient in its operation, preventing displacement of the eggs when assembled, particularly during shipment thereof, strong, durable, and practical to manufacture.

With these ends in view the invention comprises a unit consisting of two duplicate and complementary members of tray-like formation, each having a plurality of hollow truncated cones extending upward from a flat sheet-like base to a plane corresponding with a point substantially intermediate of the length of the eggs that may be contained therein, said cones being arranged so that the outer surfaces of the walls thereof engage the surfaces of the eggs, supporting the eggs in upright positions by multiple points of contact, thereby providing relatively open accessible areas in which the maximum amount of circulation is obtained, and in which at the same time the eggs are held in position by said cones of both tray-like members.

Other features and advantages of the invention will appear from the following description taken in connection with the drawings, wherein.

Figure 1:
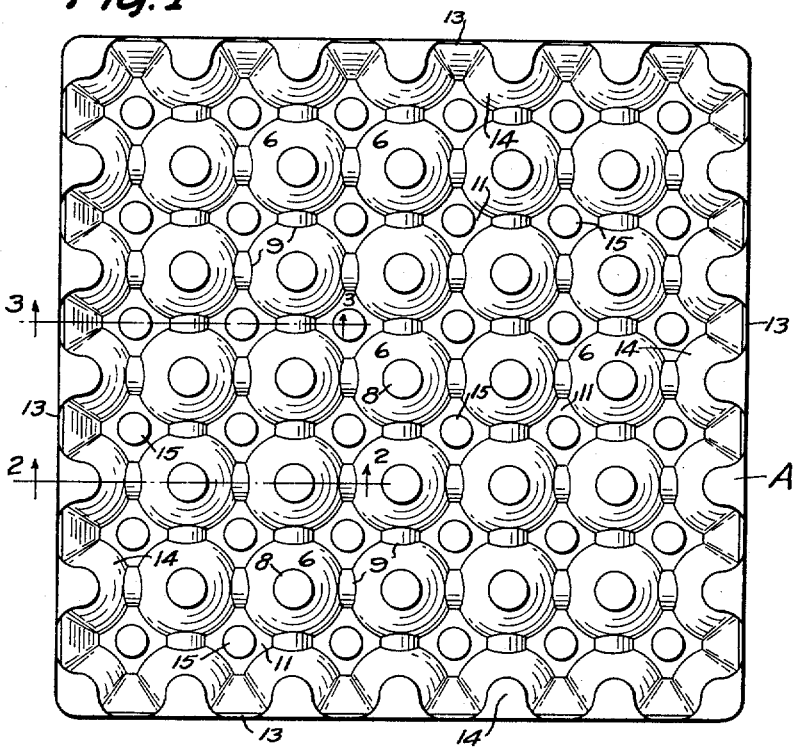
Figure 1 is a plan view of the lower half of the filler unit showing the general arrangement of the cones, open areas for the eggs and border.
Figure 2:
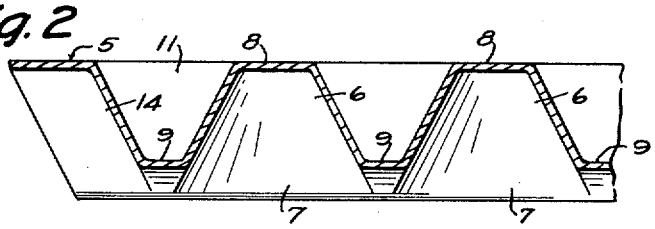
Figure 2 is an enlarged fragmentary vertical sectional view taken on line 2—2 of Figure 1 looking in the direction of the arrows.

In the drawings each half of the filler unit is referred to by the letter A, and each unit comprises a body portion 5 and truncated hollow cones 6, the larger ends of which are indicated by the numeral 7 and the smaller ends by the numeral 8.

In the design shown, the body portion 5 is formed with a continuous sheet of material made of wood pulp or any suitable material moulded in the form illustrated. With the parts arranged as shown in Figure 1, the tray is provided with thirty-six open areas 11 in which the eggs may be placed, and a similar tray is superimposed in an inverted position, thereby providing a corresponding number of open areas for receiving and holding the upper ends of eggs; however, although this is the required or usual number of eggs in a layer of one section of an egg case, it will be understood that any number of open egg areas may be provided.

The base of the tray is reinforced by raised portions 9 connecting the lower ends of the cones, and, although these are shown rounded, it will be understood that they may be of any shape. It will be noted that these sections extend continuously across the tray, reinforcing it not only at the corners but throughout the entire tray which has been found absolutely essential in trays of this type where it may be desirable to remove the entire unit filled with eggs.

Figure 3:
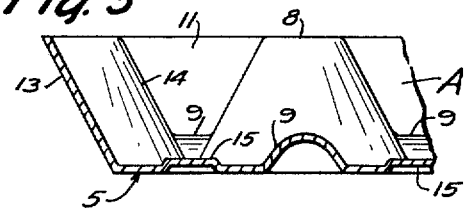
Figure 3 is a view similar to Figure 2 taken on the line 3—3 of Figure 1 looking in the direction of the arrows.

The tray is formed with a continuous border 13 extending downward in an inclined position, as shown in Figure 3, and in this border are sections of cones 14 providing means for holding the rows of eggs at the sides. The eggs, therefore, only engage holding surfaces at several points as they only touch the surfaces of the cones at the four points which makes it possible for air to circulate substantially continuously around the eggs, whereas, at the same time, the eggs are cushioned against shocks and jars, thereby reducing breakage in handling and shipping to a minimum.

Figure 4:
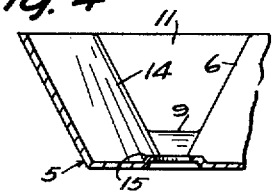
Figure 4 is a view similar to Figure 3 showing a slight modification, in which ventilating openings are provided between the cones.

Intermediate of the truncated hollow cones are sections 15 of the base, and these may be closed as shown in Figures 1 and 3, or may be provided with openings as shown in Figure 4, forming vents for ventilating purposes, and these openings may also provide means for candling a tray of eggs, it being possible to candle the entire tray at one time by placing the tray over a brilliantly illuminated area whereby the light may show through all the eggs.

It will be understood that changes may be made in the construction without departing from the spirit of the invention. One of which changes may be in the shape or design of the openings in the material or base intermediate of the cones, or in the location or provision of ventilating openings or areas at any other point or points of the filler, another may be in the omission of the raised portions of the intermediate areas between the cones, another may be in the omission of the connecting fillet shaped ridges between the cones, another may be in the use of tray-like formations of this type without the engaging borders extending continuously around the trays, and still another may be in the use of cone-like formations of any other shape instead of being round as shown and described.

Figure 5:
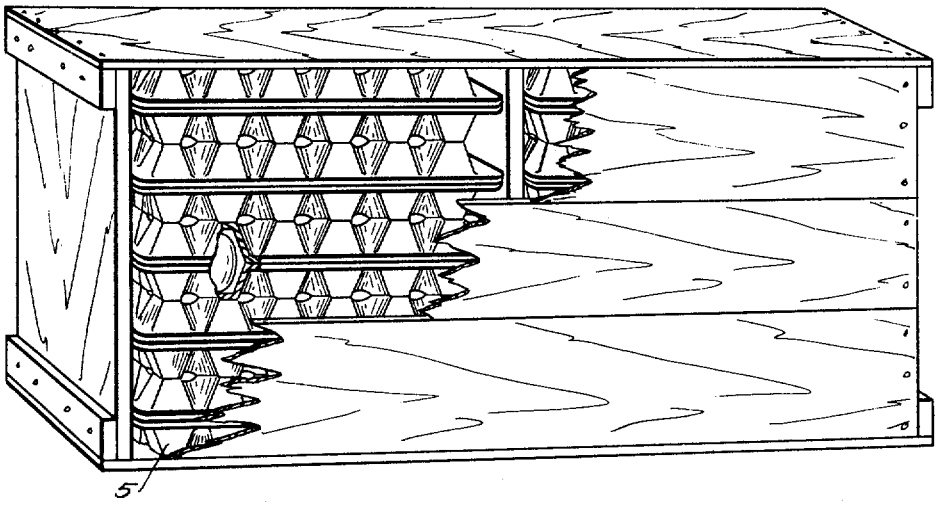
Figure 5 is a view showing a side elevation of an egg case with the filler units installed therein, with part of the case broken away showing the units, and with part of one of the units broken away showing an egg therein.
Figure 6:
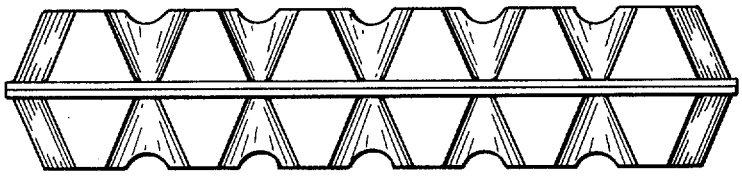
Figure 6 is a view showing a side elevation of the complete unit.
Figure 7:
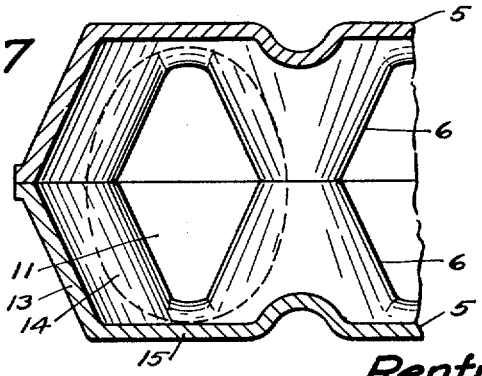
Figure 7 is a cross section through part of a unit, showing the egg holding area with an egg indicated therein in dotted lines.

The construction will be readily understood from the foregoing description. In use these fillers may be provided as shown and described, and, although all parts are formed in exactly the same shape and from the same die or mould, one part is used as a tray and another similar part is used as a cover being inverted directly above the tray, and the two parts together form a complete tray-like unit as shown in Figure 6 in which a layer of eggs may be encased, and this complete unit may be removed as a unit, or the cover may be lifted off and the lower half removed as a unit filled with eggs, or the eggs may readily be independently removed from the tray. These complete units are placed in egg cases as shown in Figure 5, and each unit contains the usual number of eggs for each layer, and the same number of eggs may be contained in one case as with the present types of fillers and flats. These tray-like members have sufficient stability to support themselves with a layer of eggs therein, and, therefore, provide convenient trays in which eggs may be handled in a packing house so that they may be passed on from one person to another, and be sized, sorted, inspected and candled, and the complete tray-like unit may then be replaced in the case with the eggs therein and with the inverted tray forming a cover thereon.

These tray-like units are, therefore, used with one tray inverted and superimposed upon the other, and with a layer of eggs in between, however, when the trays are shipped independently, they may be positioned in the same direction so that one will nest in the other.

Having thus fully described the invention, what I claim as new, and desire to secure by Letters Patent, is:

A complete, independent and interchangeable filler unit to enclose an entire layer of the usual number of eggs for packing in an egg case or the like, comprising two duplicate and complementary members of tray-like formation, one member being inverted and placed upon the other in use, thus forming the said unit, each tray-like member having a fibrous, flat, sheet-like base, and a plurality of hollow truncated cones struck from said base arranged in rows, and positioned between eggs that may be placed in said tray-like members, relatively small fillet-like projections struck from said base, joining the said hollow cones at the bases thereof for reinforcing said tray-like members, said hollow truncated cones extending upward to a common plane substantially midway of the height of the eggs placed in said tray-like members, and a continuous border also positioned in the plane midway of the height of the eggs, said border of one tray-like member engaging the border of a complementary tray-like member inverted and placed thereon, with the upwardly extending ends of the hollow truncated cones of both members also engaging and cooperating with the borders for supporting the weight of corresponding units placed thereon providing load bearing points continuously throughout the trays, said tray-like members characterized in that the eggs engage only the convex surfaces of the cones and therefore points only, and also in that the cones are arranged to form multiple contacts with both the lower and the upper portions of each egg, and, at the same time, substantially open areas around the eggs, providing access of circulating air to substantially the entire surface of each egg in the unit, eliminating dead air space.

RENFREW W. GATES.